(12) United States Patent
Miura et al.

(10) Patent No.: US 12,545,638 B2
(45) Date of Patent: Feb. 10, 2026

(54) METHOD FOR PRODUCING N-VINYLACETAMIDE AND PYROLYSIS DEVICE

(71) Applicant: SHOWA DENKO K.K., Tokyo (JP)

(72) Inventors: Yuki Miura, Yokohama (JP); Shuhei Nakamura, Ichikawa (JP); Takuya Yamanaka, Kawasaki (JP)

(73) Assignee: Resonac Corporation, Tokyo (JP)

(*) Notice: Subject to any disclaimer, the term of this patent is extended or adjusted under 35 U.S.C. 154(b) by 882 days.

(21) Appl. No.: 17/782,697

(22) PCT Filed: Dec. 7, 2020

(86) PCT No.: PCT/JP2020/045398
§ 371 (c)(1),
(2) Date: Jun. 6, 2022

(87) PCT Pub. No.: WO2021/117658
PCT Pub. Date: Jun. 17, 2021

(65) Prior Publication Data
US 2023/0022080 A1 Jan. 26, 2023

(30) Foreign Application Priority Data
Dec. 10, 2019 (JP) ................. 2019-223157

(51) Int. Cl.
*C07C 231/12* (2006.01)
*B01J 12/00* (2006.01)
(Continued)

(52) U.S. Cl.
CPC ........... *C07C 231/12* (2013.01); *B01J 12/005* (2013.01); *B01J 19/0013* (2013.01); *C07C 231/22* (2013.01); *B01J 2219/00128* (2013.01)

(58) Field of Classification Search
None
See application file for complete search history.

(56) References Cited

U.S. PATENT DOCUMENTS 5,527,963 A * 6/1996 Sato .................. C07C 231/12
564/187
2018/0057445 A1* 3/2018 Dumoleijn ............ C07C 233/03

FOREIGN PATENT DOCUMENTS

| CN | 102026965 A | 4/2011 |
| CN | 109761922 A | 5/2019 |

(Continued)

OTHER PUBLICATIONS

International Search Report for PCT/JP2020/045398 dated Jan. 19, 2021.

*Primary Examiner* — Amy C Bonaparte
(74) *Attorney, Agent, or Firm* — Sughrue Mion, PLLC

(57) ABSTRACT

A method for producing N-vinylacetamide includes a feeding step of feeding a raw material containing N-(1-methoxyethyl)acetamide (MEA) to an evaporator, an evaporation step of evaporating, by the evaporator, the raw material, to form a vaporized raw material, a superheating step of feeding the vaporized raw material to a superheater, and superheating the vaporized raw material such that a superheating temperature of the vaporized raw material is equal to or more than a temperature higher by 5° C. than a boiling point of the N-(1-methoxyethyl)acetamide (MEA) under an inner pressure of the superheater and equal to or less than 200° C., and a thermal decomposition step of feeding the superheated vaporized raw material to a thermal decomposition reactor, to thermally decompose the superheated vaporized raw material, and a content of the N-(1-methoxyethyl)acetamide in the raw material is from 80 to 100 mass %.

14 Claims, 3 Drawing Sheets

(51) Int. Cl.
*B01J 19/00* (2006.01)
*C07C 231/22* (2006.01)

(56) References Cited

FOREIGN PATENT DOCUMENTS

| | | |
|---|---|---|
| JP | 3-181451 A | 8/1991 |
| JP | 3-181452 A | 8/1991 |
| JP | 5-301851 A | 11/1993 |
| JP | 2012-140392 A | 7/2012 |
| WO | 2017/002494 A1 | 1/2017 |
| WO | 2018/084177 A1 | 5/2018 |

* cited by examiner

[Fig. 1]
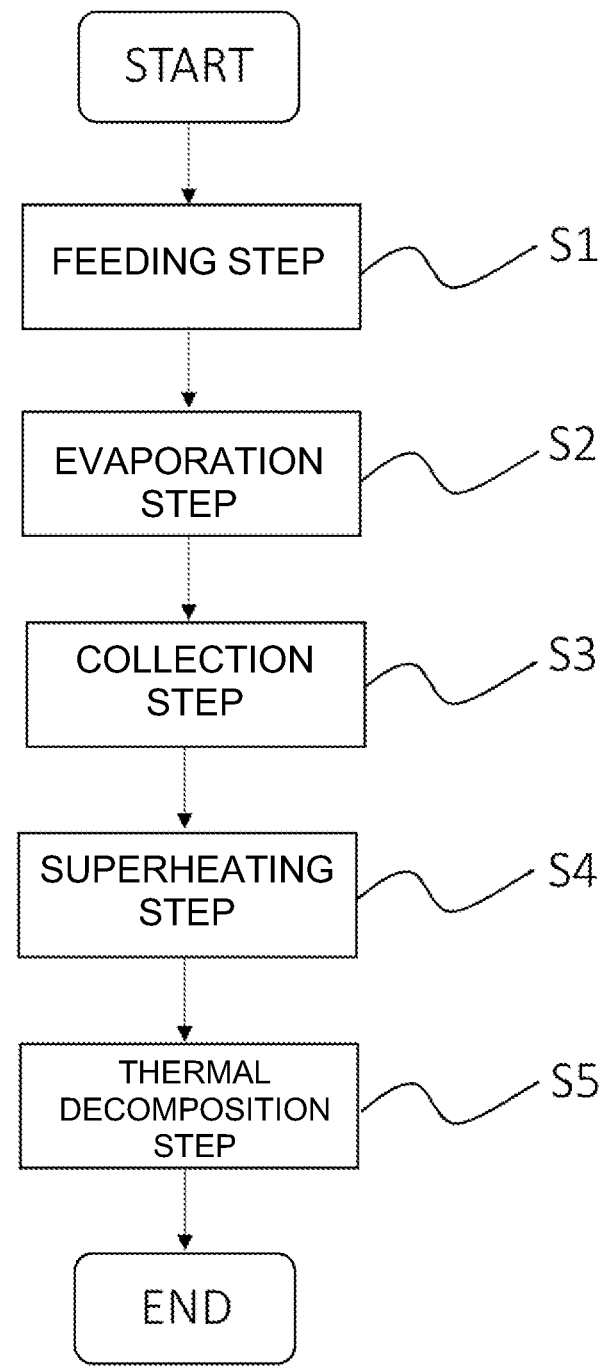

[Fig. 2]
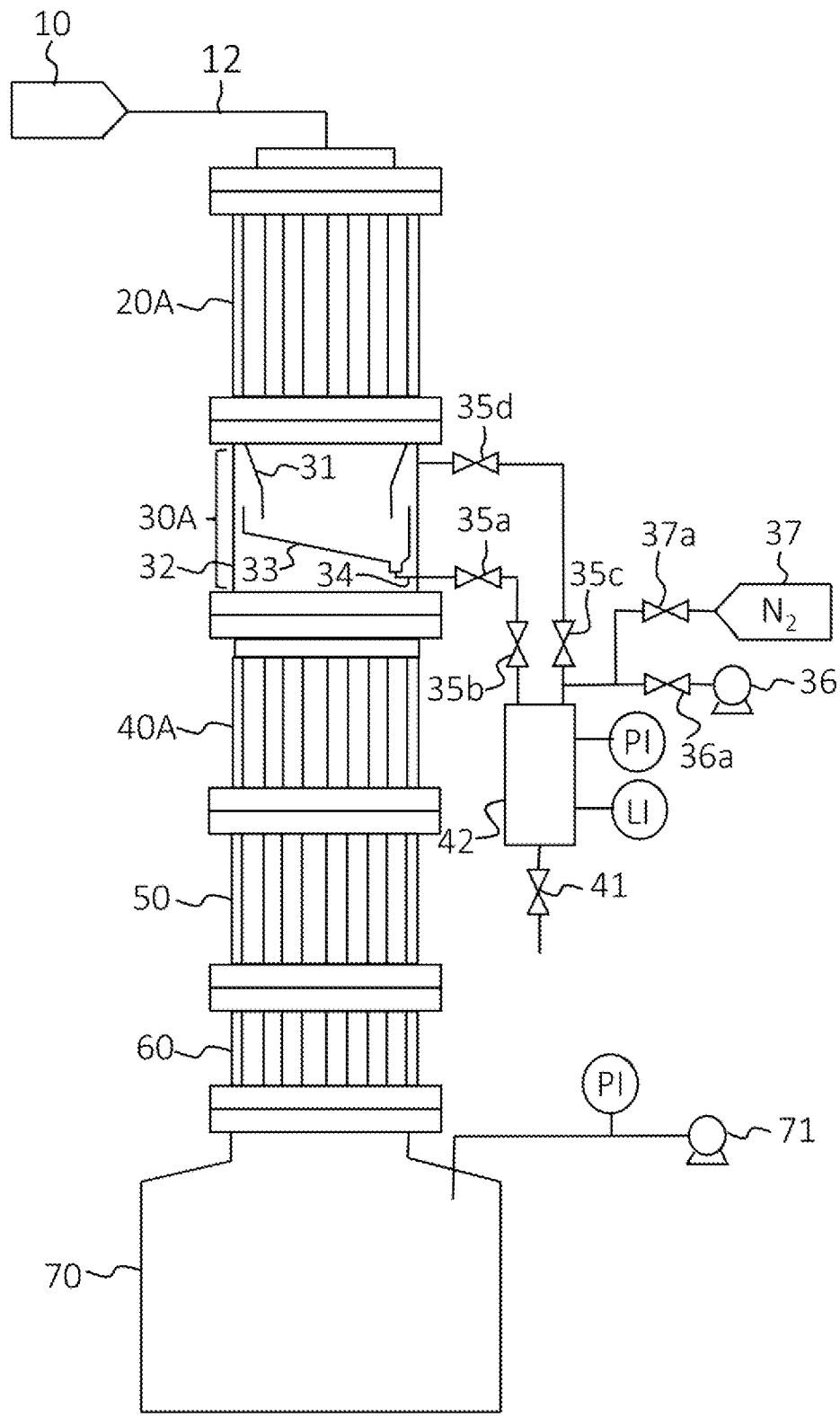

[Fig. 3]
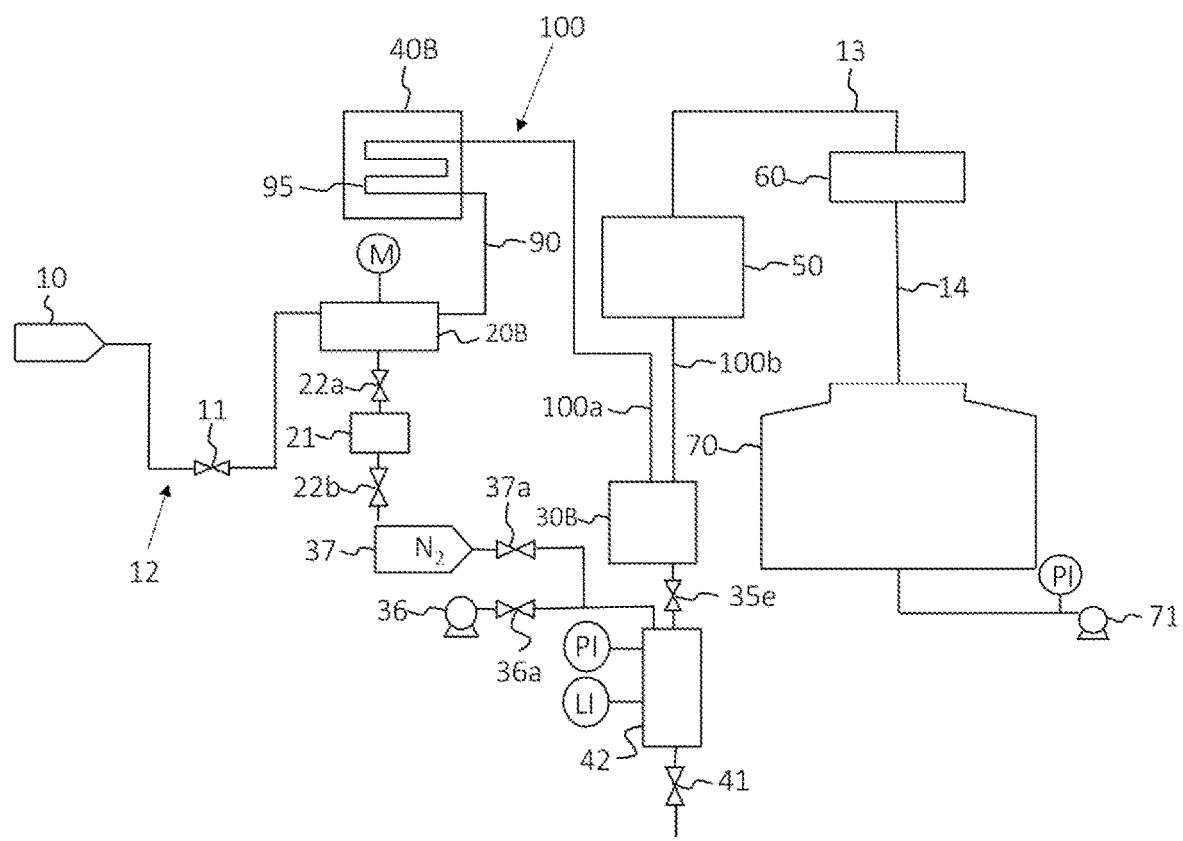

METHOD FOR PRODUCING N-VINYLACETAMIDE AND PYROLYSIS DEVICE

This application is a National Stage of International Application No. PCT/JP2020/045398 filed Dec. 7, 2020, claiming priority based on Japanese Patent Application No. 2019-223157 filed Dec. 10, 2019.

TECHNICAL FIELD

The present invention relates to a method for producing N-vinylacetamide, and to a pyrolysis device.

BACKGROUND ART

In relation to methods for producing N-vinylcarboxylic acid amide, a large number of methods have been proposed (see PTL 1, for example). In a production method described in PTL 1, a method for producing N-vinylcarboxylic acid amide by evaporating and thermally decomposing a raw material of N-(2-alkoxyethyl)carboxylic acid amide is disclosed. Thus, in the method for producing N-vinylcarboxylic acid amide by the thermal decomposition, for example, for main causes such as heat dissipation to the atmosphere, heat absorption in a thermal decomposition reactor (thermal decomposition step), change in pressure due to a mechanical trouble and stop of supply from a heat source, a raw material gas (vaporized raw material) is sometimes liquefied due to recondensation in an evaporator, a piping connecting the evaporator and the thermal decomposition reactor, or the thermal decomposition reactor, and the liquefied raw material flows into the thermal decomposition reactor at a high temperature. As a result, (i) the liquefied raw material flows along an inner wall of a tube of the thermal decomposition reactor, and (ii) the liquefied raw material is polymerized before being reevaporated on the tube inner wall of the thermal decomposition reactor. In this case, tar or solid aggregates (referred to also as coagulum) is sometimes generated, which results in a problem of the tube of the thermal decomposition reactor being blocked, thereby making it difficult to perform a stable operation.

CITATION LIST

Patent Literature

PTL 1: WO 2017/002494 (A1)

SUMMARY OF INVENTION

Technical Problem

An object of the present invention is to solve the above problems and provide a method for producing N-vinylacetamide, in which a raw material gas (vaporized raw material) can be prevented from being liquefied due to recondensation, a problem of a thermal decomposition reactor being blocked with coagulum can be inhibited, and an operation can be stably and continuously performed for a long period of time.

Solution to Problem

As a result of earnest research to solve the above problems, the present inventors have found that a raw material gas (vaporized raw material) can be prevented from being liquefied due to recondensation by providing a superheater (superheating step) between an evaporator (evaporation step) and a thermal decomposition reactor (thermal decomposition step), and by satisfying, in the superheater (superheating step), at least one of (i) superheating a raw material gas such that a superheating temperature of the raw material gas (vaporized raw material) is equal to or more than a temperature higher by a predetermined temperature (5° C.) than a boiling point of N-(1-methoxyethyl)acetamide under an inner pressure of the superheater and equal to or less than 200° C., and (ii) giving a predetermined amount of heat to the raw material gas (vaporized raw material), to complete the present invention.

Specifically, the present invention provides (1) to (15) as follows.

(1) A method for producing N-vinylacetamide, comprising: a feeding step of feeding a raw material containing N-(1-methoxyethyl)acetamide (MEA) to an evaporator, an evaporation step of evaporating, by the evaporator, the raw material, to form a vaporized raw material, a superheating step of feeding the vaporized raw material to a superheater, and superheating the vaporized raw material such that a superheating temperature of the vaporized raw material is equal to or more than a temperature higher by 5° C. than a boiling point of the N-(1-methoxyethyl)acetamide under an inner pressure of the superheater and equal to or less than 200° C., and a thermal decomposition step of feeding the superheated vaporized raw material to a thermal decomposition reactor, to thermally decompose the superheated vaporized raw material, wherein a content of the N-(1-methoxyethyl)acetamide in the raw material is from 80 to 100 mass %.

(2) A method for producing N-vinylacetamide, comprising: a feeding step of feeding a raw material containing N-(1-methoxyethyl)acetamide (MEA) to an evaporator, an evaporation step of evaporating, by the evaporator, the raw material, to form a vaporized raw material, a superheating step of feeding the vaporized raw material to a superheater, and giving an amount of heat of 1.0 KJ/mol or more to the vaporized raw material to superheat the vaporized raw material, and a thermal decomposition step of feeding the superheated vaporized raw material to a thermal decomposition reactor, to thermally decompose the superheated vaporized raw material, wherein a content of the N-(1-methoxyethyl)acetamide in the raw material is from 80 to 100 mass %.

(3) The method for producing N-vinylacetamide according to the above (1) or (2), wherein the evaporation step is performed under reduced pressure.

(4) The method for producing N-vinylacetamide according to any one of the above (1) to (3), wherein the thermal decomposition step is performed under reduced pressure.

(5) The method for producing N-vinylacetamide according to any one of the above (1) to (4), wherein the evaporator is a falling film evaporator.

(6) The method for producing N-vinylacetamide according to any one of the above (1) to (4), wherein the evaporator is a forced film evaporator.

(7) The method for producing N-vinylacetamide according to any one of the above (1) to (6), wherein a downstream end of the evaporator is connected to an upstream end of the superheater via a first piping, and a downstream end of the first piping is at the highest position in the first piping.

(8) The method for producing N-vinylacetamide according to any one of the above (1) to (7), wherein a downstream end of the superheater is connected to an upstream end of the thermal decomposition reactor via a second piping, and an upstream end of the second piping is at the highest position in the second piping.

(9) The method for producing N-vinylacetamide according to any one of the above (1) to (8), further comprising, between the evaporation step and the thermal decomposition step, a collection step of collecting, from the raw material fed to the evaporator, a liquid raw material that is not vaporized and a liquid raw material comprising a part of the vaporized raw material that is liquefied, the collection step being a step of collecting the liquid raw material by a raw material collection device provided between the evaporator and the thermal decomposition reactor.

(10) The method for producing N-vinylacetamide according to the above (9), wherein a downstream end of the evaporator is joined to an upstream end of the raw material collection device.

(11) The method for producing N-vinylacetamide according to the above (9) or (10), wherein a downstream end of the raw material collection device is joined to an upstream end of the superheater.

(12) The method for producing N-vinylacetamide according to any one of the above (9) to (11), wherein the vaporized raw material is fed through the raw material collection device to the thermal decomposition reactor.

(13) The method for producing N-vinylacetamide according to any one of the above (9) to (12), wherein the raw material collection device comprises: a cylindrical part through which the vaporized raw material is distributed, a collecting section with which flow of the vaporized raw material flowing through the cylindrical part partially or entirely collides, and which collects, from the raw material fed to the evaporator, the liquid raw material that is not vaporized and the liquid raw material comprising a part of the vaporized raw material that is liquefied, and a discharge piping through which the liquid raw material collected by the collecting section is discharged to outside the cylindrical part.

(14) A pyrolysis device comprising: an evaporator that is capable of evaporating a raw material to form a vaporized raw material, a superheater that is connected to the evaporator, and is capable of superheating the vaporized raw material to a temperature equal to or more than a temperature higher by 5° C. than a boiling point of the N-(1-methoxyethyl)acetamide under an inner pressure of the superheater and equal to or less than 200° C., and a thermal decomposition reactor that is connected to the superheater, and is capable of thermally decomposing the superheated vaporized raw material.

Advantageous Effects of Invention

According to the present invention, a method for producing N-vinylacetamide can be provided, in which a raw material gas (vaporized raw material) can be prevented from being liquefied due to recondensation, a problem of a thermal decomposition reactor being blocked with coagulum can be inhibited, and an operation can be stably and continuously performed for a long period of time.

BRIEF DESCRIPTION OF DRAWINGS

FIG. 1 is a flowchart showing a method for producing N-vinylacetamide of the present invention.

FIG. 2 is a schematic overall view in a case where an evaporator is a falling film evaporator, in the method for producing N-vinylacetamide of the present invention.

FIG. 3 is a schematic overall view in a case where the evaporator is a forced film evaporator, in the method for producing N-vinylacetamide of the present invention.

DESCRIPTION OF EMBODIMENTS

In the present description, a preferred provision can be arbitrarily selected, and a combination of preferred provisions can be more preferred.

In the present description, "XX to YY" means "equal to or more than XX and equal to or less than YY".

In the present description, for a preferable numerical value range (e.g., a range of a content or the like), stepwise described lower and upper limit values can be independently combined. For example, from description of "preferably from 10 to 90, more preferably from 30 to 60", "a preferable lower limit value (10)" and "a more preferable upper limit value (60)" can be combined, to describe "from 10 to 60".

Method for Producing N-vinylacetamidel

As shown in FIG. 1, a method for producing N-vinylacetamide according to an embodiment of the present invention comprises a feeding step S1, an evaporation step S2, an arbitrary collection step S3, a superheating step S4, and a thermal decomposition step S5. Hereinafter, the method for producing N-vinylacetamide according to the embodiment of the present invention will be described in detail.

Feeding Step S1

The feeding step S1 is a step of feeding a raw material containing N-(1-methoxyethyl)acetamide (MEA) to an evaporator.

In the method for producing N-vinylacetamide according to the embodiment of the present invention, as a part or all of the raw material, N-(1-methoxyethyl)acetamide represented by the following structural formula (1) is used.

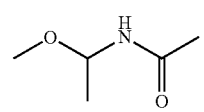

Structural formula (1)

There are not any special restrictions on a content of N-(1-methoxyethyl)acetamide in the raw material as long as the content is from 80 to 100 mass %, and the content is preferably from 90 to 100 mass %, and more preferably from 95 to 100 mass %.

There are not any special restrictions on a component other than N-(1-methoxyethyl)acetamide in the raw material, and examples of the component include acetamide, and methanol.

In the feeding step S1, a feeding speed of the raw material to the evaporator, which depends on a size and capacity of the evaporator, is preferably from 5 to 350 kg/h, more preferably from 10 to 150 kg/h, and further preferably from 15 to 80 kg/h from a viewpoint of stably evaporating the raw material.

Evaporation Step S2

The evaporation step S2 is a step of evaporating, by the evaporator, the raw material, to form a vaporized raw material.

There are not any special restrictions on the evaporator for use in the evaporation step S2, but it is preferable from a viewpoint of efficiently evaporating the raw material that the evaporator is a falling film evaporator or a forced film evaporator.

The evaporation step S2 can be performed under reduced pressure or under normal pressure and is preferably performed under reduced pressure. Specifically, the evaporation step S2 is performed with a reaction pressure preferably from 1 to 30 kPa, more preferably from 3 to 25 kPa, and further preferably from 5 to 22 kPa.

The evaporation step S2 is required to be performed specifically at a temperature to heat and evaporate the raw material and form the vaporized raw material, preferably from 100 to 200° C., more preferably from 110 to 190° C., and further preferably from 120 to 180° C.

In the evaporation step S2, from a viewpoint of making a heat transfer area of the evaporator smaller to make the evaporator smaller, it is preferable to give a minimum amount of heat required to evaporate the raw material.

In a case where an amount of heat given in the evaporation step S2 is in excess of the minimum amount of heat required to evaporate the raw material, a more sufficient amount of heat is given to prepare for heat dissipation to the atmosphere or heat absorption in a thermal decomposition reaction step.

Collection Step S3

The collection step S3, between the evaporation step S2 and the thermal decomposition step S5, is an arbitrary step of collecting, from the raw material fed to the evaporator, a liquid raw material that is not vaporized and a liquid raw material comprising a part of the vaporized raw material that is liquefied. The vaporized raw material in a vaporized state is for use in the thermal decomposition step. Note that the collection step S3 is preferably performed by a raw material collection device provided between the evaporator and a thermal decomposition reactor.

FIG. 1 shows the evaporation step S2, the collection step S3, and the superheating step S4 in this order. However, the order is not limited to this example. For example, the evaporation step S2, the superheating step S4 and the collection step S3 may be performed in this order.

If even a small amount of liquid raw material is introduced into the thermal decomposition reactor, coagulum is generated. The thermal decomposition reactor is blocked with coagulum, and an operation cannot be continued. Even when a total volume of the thermal decomposition reactor is not blocked with coagulum, the operation cannot be continued if a small volume of the thermal decomposition reactor on a raw material introduction side is blocked. In the collection step S3, the liquid raw material is collected in a collection pot outside a system of a production apparatus, which can more securely inhibit the liquid raw material from being introduced into the thermal decomposition reactor. As a result, it is possible to continue the operation for a longer period of time.

Examples of main causes for the generation of the liquid raw material during the operation of the production apparatus include the heat dissipation to the atmosphere, the heat absorption in the thermal decomposition reactor (thermal decomposition step), fluctuations in operating pressure due to mechanical failure and operation mistake, stop or lack of heat source of the evaporator due to the mechanical failure and operation mistake, poor evaporation due to the heat transfer area decreased by scale (black skin) generated in the evaporator, and introduction of the raw material during insufficient heating of the apparatus at start of the operation.

Superheating Step S4

The superheating step S4 is a step of feeding the vaporized raw material to a superheater, to superheat the vaporized raw material, the step satisfying at least one of (i) a superheating temperature of the vaporized raw material being equal to or more than a temperature higher by 5° C. than a boiling point of N-(1-methoxyethyl)acetamide under a superheater pressure and equal to or less than 200° C., and (ii) giving an amount of heat of 1.0 kJ/mol or more to the vaporized raw material.

There are not any special restrictions on the superheating temperature of the vaporized raw material in the superheating step S4 as long as the temperature is equal to or more than the temperature higher by 5° C. than the boiling point of N-(1-methoxyethyl)acetamide under the inner pressure of the superheater and equal to or less than 200° C. The superheating temperature is preferably from 165 to 200° C., more preferably from 170 to 195° C., and further preferably from 173 to 190° C. Note that an upper limit of the superheating temperature of the vaporized raw material is not a temperature added to the boiling point, and simply represents a temperature of the upper limit.

Here, in the present description, "the superheating temperature of the vaporized raw material" means "the highest temperature of the vaporized raw material in the superheater" and is usually a temperature (outlet gas temperature) of the vaporized raw material in a downstream end of the superheater.

Note that a heat medium saturated vapor temperature at 2.0 MPaG (gauge pressure) (industrial vapor upper limit pressure) is 215° C., and hence it is also preferable in terms of cost that the upper limit of the superheating temperature is 200° C.

There are not any special restrictions on the amount of heat given to the vaporized raw material in the superheating step S4 as long as the amount of heat is 1.0 kJ/moL or more, and the amount of heat is preferably from 1.0 to 9.0 kJ/moL, more preferably from 1.5 to 8.0 kJ/moL, and further preferably from 2.0 to 7.0 kJ/moL.

Lower limit values of the above-described superheating temperature of the vaporized raw material and the amount of heat given to the vaporized raw material are determined as follows.

From an outlet of the superheater to a tube in a pyrolysis device, a location (e.g., a joint in a jacket, or a channel portion of the pyrolysis device) where heat cannot enter exists, and a temperature drops due to the heat absorption in the thermal decomposition step also in this location where heat cannot enter. The drop in temperature due to the heat absorption in the thermal decomposition step can be calculated from an amount of heat dissipated, a reaction rate, heat of reaction, and a staying time. In consideration of the calculated temperature drop and temperature error (margin), the lower limit values of the superheating temperature of the vaporized raw material and the amount of heat given to the vaporized raw material are determined.

On the other hand, upper limit values of the above-described superheating temperature of the vaporized raw material and the amount of heat given to the vaporized raw material are determined as follows.

To inhibit reaction from progressing excessively in a location other than the pyrolysis device, thermal decomposition reaction is required to be controlled such that the reaction rate is sufficiently lower than a reaction rate in the pyrolysis device. Therefore, usually, from a viewpoint of controlling the thermal decomposition reaction, the upper limit values of the superheating temperature of the vaporized raw material and the amount of heat given to the vaporized raw material are set, and the upper limit values of the superheating temperature of the vaporized raw material and the amount of heat given to the vaporized raw material may be set depending on a usable heat medium temperature.

The superheating step S4 can be performed under reduced pressure or under normal pressure and is preferably performed under reduced pressure. Specifically, the superheating step S4 is performed with a pressure preferably from 1 to 30 kPa, more preferably from 3 to 25 kPa, and further preferably from 5 to 22 kPa.

Thermal Decomposition Step S5

The thermal decomposition step S5 is a step of feeding the superheated vaporized raw material to the thermal decomposition reactor, to thermally decompose the superheated vaporized raw material. There are not any special restrictions on flow of the vaporized raw material to be fed to the thermal decomposition reactor as long as the material flows into the thermal decomposition reactor, and the flow may be ascending flow or descending flow.

The thermal decomposition step S5 can be performed under reduced pressure or under normal pressure and is preferably performed under reduced pressure. Specifically, the thermal decomposition step S5 is performed with a reaction pressure preferably from 1 to 30 kPa, more preferably from 3 to 25 kPa, and further preferably from 5 to 22 kPa.

From a viewpoint of efficiently performing thermal decomposition, the thermal decomposition step S5 is performed at a temperature preferably from 250 to 500° C., more preferably from 300 to 480° C., and further preferably from 350 to 450° C.

From a viewpoint of securely performing the thermal decomposition, the staying time in the thermal decomposition step S5 is preferably from 0.1 to 10 seconds, more preferably from 0.2 to 9 seconds, and further preferably from 0.3 to 8 seconds.

It is preferable from the viewpoint of efficiently performing the thermal decomposition that the thermal decomposition reactor includes a multi-tube structure.

The raw material to be fed to the thermal decomposition reactor is preferably the vaporized raw material subjected to the collection step. The vaporized raw material subjected to the collection step is fed to the thermal decomposition reactor, so that the liquid raw material can be securely inhibited from being introduced into the thermal decomposition reactor, and the generation of coagulum can be inhibited more.

The N-vinylacetamide obtained by the above steps is represented by the following structural formula (2) and is obtained from N-(1-methoxyethyl)acetamide contained in the raw material and represented by the structural formula (1).

Structural formula (2)

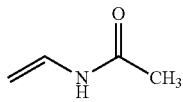

First Production Apparatus

As shown in FIG. 2, a first production apparatus that performs the method for producing N-vinylacetamide according to the embodiment of the present invention comprises a raw material feeding device 10 that performs the feeding step S1, an evaporator (falling film evaporator) 20A that performs the evaporation step S2, a raw material collection device 30A that performs the collection step S3, a superheater 40A that performs the superheating step S4, a thermal decomposition reactor 50 that performs the thermal decomposition step S5, a cooler 60 that cools and liquefies a reactant thermally decomposed in the thermal decomposition step S5, and a reaction solution receiver 70 that stores the reactant liquefied in the cooler 60.

The raw material feeding device 10 has a downstream end connected to an upstream end of the evaporator 20A via a piping 12, a downstream end of the evaporator 20A is connected to an upstream end of the raw material collection device 30A, a downstream end of the raw material collection device 30A is connected to an upstream end of the superheater 40A, a downstream end of the superheater 40A is connected to an upstream end of the thermal decomposition reactor 50, a downstream end of the thermal decomposition reactor 50 is connected to an upstream end of the cooler 60, and a downstream end of the cooler 60 is connected to an upstream end of the reaction solution receiver 70.

The falling film evaporator is an evaporator that evaporates the liquid raw material flowing like a film downward along an inner surface of each evaporation tube, and the evaporator has, for example, a structure where a large number of tubes are installed in an interior of a shell, and a liquid flows downward along an inner wall of each of the tubes. The superheater 40A includes a structure similar to the distiller 20A.

In the raw material collection device 30A, a collection pot 42 that stores the collected liquid raw material is disposed.

In the reaction solution receiver 70, a pressure pump 71 is provided, and a pressure of the whole production apparatus can be adjusted with the pressure pump 71. The pressure of the whole production apparatus can be confirmed with a pressure indicator PI provided in the reaction solution receiver 70.

The raw material collection device 30A may include a structure that inhibits the liquid raw material from being introduced into the superheater 40A and the thermal decomposition reactor 50.

For example, as shown in FIG. 2, it is preferable that the raw material collection device 30A is configured to comprise a cylindrical part 32 through which the vaporized raw material is distributed, a collecting section 33 with which flow of the vaporized raw material flowing through the cylindrical part 32 partially or entirely collides, and which collects, from the raw material fed to the evaporator, the liquid raw material that is not vaporized and the liquid raw material comprising a part of the vaporized raw material that is liquefied, and a discharge piping 34 through which the liquid raw material collected in the collecting section 33 is discharged to outside the cylindrical part 32. It is preferable that the raw material collection device 30A further comprises a distribution inhibiting section 31 configured so that the vaporized raw material flowing through the cylindrical part 32 entirely collides with the collecting section 33.

It is preferable that the distribution inhibiting section 31 has a tapered shape that narrows down flow of the vaporized raw material toward downstream.

It is preferable that the collecting section 33 has a dish shape that receives the flow of the vaporized raw material and has the shape including an accumulating portion that accumulates the liquid raw material.

According to the above configuration of the raw material collection device 30A, the liquid raw material that is not vaporized and the liquid raw material comprising the part of the vaporized raw material that is liquefied collide with the collecting section 33 and are collected from the raw material fed to the evaporator, and the liquid raw materials are discharged through the discharge piping 34 to outside the cylindrical part 32. The vaporized raw material that collides with the collecting section 33 passes through a space between the collecting section 33 and the distribution inhibiting section 31 toward the superheater 40A and the thermal decomposition reactor 50. That is, according to the above configuration of the raw material collection device 30A, the vaporized raw material that collides with the collecting section 33 and from which the liquid raw material is collected is introduced into the superheater 40A and the thermal decomposition reactor 50.

The liquid raw material collected in the raw material collection device 30A is sent to the collection pot 42. The collection pot 42 can control the liquid raw material with gate valves 35a and 35b. Furthermore, in the collection pot 42, a pressure of the collection pot 42 can be adjusted through a pressure pump 36 and the gate valves 35a to 35d. The pressure of the collection pot 42 can be confirmed with a pressure indicator PI.

The liquid raw material collected in the raw material collection device 30A always flows through the gate valves 35a and 35b into the collection pot 42. An amount of the material to be collected into the collection pot 42 can be confirmed with a liquid level indicator LI such as a liquid level confirmation window installed in the collection pot 42. When collecting the liquid raw material stored in the collection pot 42, the gate valves 35b and 35c are closed, a nitrogen valve 37a is then opened to introduce nitrogen from a nitrogen supply device 37 into the collection pot 42 and to return to normal pressure, and an extraction valve 41 is opened. After the collection, the extraction valve 41 and the nitrogen valve 37a are closed, a gate valve 36a is opened to adjust a pressure to the same pressure as in the whole production apparatus with the pressure pump 36, the gate valve 35c is then opened, and the gate valve 35b is next opened, to obtain a state where the liquid raw material can be collected.

A temperature of the raw material collection device 30A is suitably selected from a temperature range in which the vaporized raw material generated in the evaporator 20A does not condense. A temperature of the collection pot 42 may only be a temperature at which the collected liquid raw material does not solidify.

It is preferable to feed, to the evaporator 20A, the liquid raw material collected in the raw material collection device 30A. In the first production apparatus shown in FIG. 2, the liquid raw material collected in the collection pot 42 is fed to the evaporator 20A. The collected liquid raw material is fed to the evaporator 20A again, so that the raw material can be efficiently used.

As shown in FIG. 2, a configuration is preferable where the downstream end of the evaporator 20A is joined to the upstream end of the raw material collection device 30A. According to the configuration where the downstream end of the evaporator 20A is joined to the upstream end of the raw material collection device 30A, the vaporized raw material heated and evaporated in the evaporator 20A can be directly sent to the raw material collection device 30A. That is, a part of the vaporized raw material can be prevented from being liquefied between the evaporator 20A and the raw material collection device 30A.

As shown in FIG. 2, a configuration is preferable where the downstream end of the raw material collection device 30A is joined to the upstream end of the superheater 40A. According to the configuration where the downstream end of the raw material collection device 30A is joined to the upstream end of the superheater 40A, the vaporized raw material collected in the raw material collection device 30A can be directly sent to the superheater 40A. That is, a part of the vaporized raw material can be prevented from being liquefied between the raw material collection device 30A and the superheater 40A.

As shown in FIG. 2, a configuration is preferable where the downstream end of the superheater 40A is joined to the upstream end of the thermal decomposition reactor 50. According to the configuration where the downstream end of the superheater 40A is joined to the upstream end of the thermal decomposition reactor 50, the vaporized raw material superheated in the superheater 40A can be directly sent to the thermal decomposition reactor 50. That is, a part of the vaporized raw material can be prevented from being liquefied between the superheater 40A and the thermal decomposition reactor 50.

As shown in FIG. 2, a configuration is preferable where the downstream end of the thermal decomposition reactor 50 is joined to the upstream end of the cooler 60. According to the configuration where the downstream end of the thermal decomposition reactor 50 is joined to the upstream end of the cooler 60, an object obtained by the thermal decomposition in the thermal decomposition reactor 50 can be directly sent to the cooler 60.

As shown in FIG. 2, a configuration is preferable where the downstream end of the cooler 60 is joined to the upstream end of the reaction solution receiver 70. According to the configuration where the downstream end of the cooler 60 is joined to the upstream end of the reaction solution receiver 70, the object cooled in the cooler 60 can be directly sent to the reaction solution receiver 70.

Second Production Apparatus

As shown in FIG. 3, a second production apparatus that performs the method for producing N-vinylacetamide according to the embodiment of the present invention comprises a raw material feeding device 10 that performs the feeding step S1, an evaporator (a forced film evaporator) 20B that performs the evaporation step S2, a superheater 40B that performs the superheating step S4, a raw material collection device 30B that performs the collection step S3, a thermal decomposition reactor 50 that performs the thermal decomposition step S5, a cooler 60 that cools and liquefies a reactant thermally decomposed in the thermal decomposition step S5, and a reaction solution receiver 70 that stores the reactant liquefied in the cooler 60.

The raw material feeding device 10 has a downstream end connected to an upstream end of the evaporator 20B via a piping 12, a downstream end of the evaporator 20B is connected to an upstream end of the superheater 40B via a first piping 90, a downstream end of the superheater 40B is connected to an upstream end of the raw material collection device 30B via a second piping front stage 100a, a downstream end of the raw material collection device 30B is connected to an upstream end of the thermal decomposition reactor 50 via a second piping rear stage 100b, a downstream end of the thermal decomposition reactor 50 is connected to an upstream end of the cooler 60 via a piping 13, and a downstream end of the cooler 60 is connected to an upstream end of the reaction solution receiver 70 via a piping 14.

The forced film evaporator is an evaporator in which the liquid raw material flows inside like a film along an inner surface of each evaporation tube, a fan or the like is rotated with a motor (e.g., a motor M in FIG. 3) to generate a propulsive force in the evaporation tube due to flow of air, and the film-like raw material in the evaporation tube flows forward forcibly with the propulsive force to be evaporated.

In the superheater 40B, a piping 95 connecting the first piping 90 and a second piping 100 meanders to give a predetermined amount of heat to a gas raw material in the piping 95, so that the gas raw material reaches a predetermined temperature.

In the raw material collection device 30B, a collection pot 42 that stores the collected liquid raw material is disposed.

In the reaction solution receiver 70, a pressure pump 71 is provided, and a pressure of the whole production apparatus can be adjusted with the pressure pump 71. The pressure of the whole production apparatus can be confirmed with a pressure indicator PI provided in the reaction solution receiver 70.

It is preferable that in the evaporator 20B, a collection pot 21 is disposed to collect, from a raw material fed to the evaporator 20B, a liquid raw material that is not vaporized and a liquid raw material comprising a part of a vaporized raw material that is liquefied. From a viewpoint of facilitating the collection of the liquid raw material, it is preferable to dispose the collection pot 21 at a position lower than a position of the evaporator 20B. The collection pot 21 comprises a gate valve 22a that separates the evaporator 20B from the collection pot 21, and an extraction valve 22b that extracts the liquid raw material collected in the collection pot 21 to outside a system. The collection pot 21 can control the liquid raw material with the gate valve 22a and the extraction valve 22b. When collecting the liquid raw material that is not vaporized from the raw material fed to the evaporator 20B, the extraction valve 22b is closed, and the gate valve 22a is opened. When extracting the liquid raw material collected in the collection pot 21, the gate valve 22a is closed, and the extraction valve 22b is opened.

As shown in FIG. 3, a configuration is preferable where the downstream end of the evaporator 20B is connected to the upstream end of the superheater 40B via the first piping 90, and a downstream end of the first piping 90 is at the highest position in the first piping 90. According to the configuration where the downstream end of the first piping 90 is at the highest position in the first piping 90, the liquid raw material that is not vaporized and the liquid raw material comprising a part of the vaporized raw material that is liquefied are collected from the raw material flowing through the first piping 90, and flow into and stay in the superheater 40B, which enables an operation without receiving any thermal history and without generating any aggregates.

As shown in FIG. 3, a configuration is preferable where the downstream end of the superheater 40B is connected to the upstream end of the raw material collection device 30B via the second piping front stage 100a, and an upstream end of the second piping front stage 100a is at the highest position in the second piping front stage 100a. According to the configuration where the upstream end of the second piping front stage 100a is at the highest position in the second piping front stage 100a, the liquid raw material comprising a part of the vaporized raw material that is liquefied can be efficiently collected from the raw material flowing through the second piping front stage 100a, in the raw material collection device 30B.

As shown in FIG. 3, a configuration is preferable where the downstream end of the raw material collection device 30B is connected to the upstream end of the thermal decomposition reactor 50 via the second piping rear stage 100b, and an upstream end of the second piping rear stage 100b is at the lowest position in the second piping rear stage 100b. According to the configuration where the upstream end of the second piping rear stage 100b is at the lowest position in the second piping rear stage 100b, even if a part of the vaporized raw material flowing through the second piping rear stage 100b is liquefied, the liquid raw material obtained by liquefying the part can be efficiently collected in the raw material collection device 30B.

As shown in FIG. 3, a configuration is preferable where the downstream end of the superheater 40B is connected to upstream end of the thermal decomposition reactor 50 via the second piping 100 (the front stage 100a and rear stage 100b of the second piping), and an upstream end of the second piping 100 is at the highest position in the second piping 100. According to the configuration where the upstream end of the second piping 100 is at the highest position in the second piping 100, even if a part of the vaporized raw material flowing through the second piping 100 is liquefied, the liquid raw material obtained by liquefying the part can be efficiently collected in the raw material collection device 30B.

The liquid raw material collected in the raw material collection device 30B is sent to the collection pot 42. From the viewpoint of facilitating the collection of the liquid raw material, it is preferable to dispose the collection pot 42 at a position lower than a position of the raw material collection device 30B. The collection pot 42 can control the liquid raw material with a gate valve 35e and an extraction valve 41. Furthermore, in the collection pot 42, a pressure of the collection pot 42 can be adjusted with a pressure pump 36, the gate valve 35e and the extraction valve 41. The pressure of the collection pot 42 can be confirmed with a pressure indicator PI.

The liquid raw material collected in the raw material collection device 30B always flows through the gate valve 35e into the collection pot 42. An amount of the raw material to be collected in the collection pot 42 can be confirmed with a liquid level indicator LI such as a liquid level confirmation window installed in the collection pot 42. When collecting the liquid raw material stored in the collection pot 42, the gate valve 35e is closed, a nitrogen valve 37a is then opened to introduce nitrogen from a nitrogen supply device 37 into the collection pot 42 and to return to normal pressure, and the extraction valve 41 is opened. After the collection, the extraction valve 41 and the nitrogen valve 37a are closed, a gate valve 36a is opened to adjust a pressure to the same pressure as in the whole production apparatus with the pressure pump 36, and the gate valve 35e is then opened to obtain a state where the liquid raw material can be collected.

A temperature of the raw material collection device 30B is suitably selected from a temperature range in which the vaporized raw material generated in the evaporator 20B and superheated in the superheater 40B does not condense. A temperature of the collection pot 42 may only be a temperature at which the collected liquid raw material does not solidify.

It is preferable to feed, to the evaporator 20B, the liquid raw material collected in the raw material collection device 30B. In the second production apparatus shown in FIG. 3, the liquid raw material collected in the collection pot 42 is fed to the evaporator 20B. Furthermore, in the second production apparatus shown in FIG. 3, it is also preferable to feed, to the evaporator 20B, the liquid raw material collected in the collection pot 21. The collected liquid raw material is fed to the evaporator again, so that the raw material can be efficiently used.

In the production apparatus shown in FIG. 3, it is preferable that the second piping rear stage 100b is configured to be connected to a side surface or an upper surface of the raw material collection device 30B. According to the configuration where the second piping rear stage 100b is connected to the side surface or the upper surface of the raw material collection device 30B, the liquid raw material collected in the raw material collection device 30B can be inhibited from flowing into the second piping rear stage 100b.

In the second production apparatus shown in FIG. 3, the downstream end of the raw material collection device 30B may be configured to be joined to the upstream end of the thermal decomposition reactor 50. According to the configuration where the downstream end of the raw material collection device 30B is joined to the upstream end of the thermal decomposition reactor 50, the vaporized raw material from which the liquid raw material is collected in the raw material collection device 30B can be directly sent to the thermal decomposition reactor 50. That is, a part of the vaporized raw material can be prevented from being liquefied between the raw material collection device 30B and the thermal decomposition reactor 50.

Also, in the production apparatus shown in FIG. 3, in place of the raw material collection device 30B, the gate valve 35e, the pressure pump 36, the collection pot 42, and the extraction valve 41, the raw material collection device 30A, the gate valves 35a to 35d, the pressure pump 36, the collection pot 42 and the extraction valve 41 in FIG. 2 may be provided in the configuration.

Pyrolysis Device

A pyrolysis device according to an embodiment of the present invention comprises an evaporator that is capable of evaporating a raw material to form a vaporized raw material, a superheater that is connected to the evaporator, and is capable of superheating the vaporized raw material to a temperature equal to or more than a temperature higher by 5° C. than a boiling point of N-(1-methoxyethyl)acetamide under an inner pressure of the superheater and equal to or less than 200° C., and a thermal decomposition reactor that is connected to the superheater, and is capable of thermally decomposing the superheated vaporized raw material, and further comprises the above-described raw material collection device, cooler, reaction solution receiver, collection pot, nitrogen supply device, pressure pump, gate valve, nitrogen valve, extraction valve, first piping, second piping, liquid level indicator, motor, pressure indicator and others as required.

By use of the pyrolysis device according to the embodiment of the present invention, the above-described method for producing N-vinylacetamide according to the embodiment of the present invention can be suitably performed.

EXAMPLES

Hereinafter, the present invention will be further specifically described by way of examples, and the present invention is not limited to the following examples without departing from the scope.

Example 1

A production apparatus shown in FIG. 2 was used.

As an evaporator, a falling film evaporator was used in which a large number of tubes were installed in an interior of a shell. Such a shell and tube evaporator comprising a structure where liquid flowed downward along inner walls of these tubes was used (a tube diameter: 25.4 mm, a tube length: 2500 mm, and a number of tubes: 22).

In the evaporator on a shell side, saturated vapor at 0.7 MPaG (a gauge pressure) (a temperature of 170° C.) was introduced, and on a tube side, N-(1-methoxyethyl)acetamide that was a liquid raw material was set to decompression conditions at 20 kPa (an absolute pressure) with decompression equipment (a pressure pump) installed in a reaction solution receiver, fed to flow downward along the inner walls of the tubes at a feeding speed of 20 kg/h, and evaporated. At this time, a gas temperature in an outlet of the evaporator was 160° C. (a boiling point at 20 kPa (an absolute pressure) of N-(1-methoxyethyl)acetamide).

In a raw material collection device, flanges each having an outer diameter of 267.4 mm were installed to upper and lower parts of the device and joined to the evaporator and a superheater, respectively. The saturated vapor at 0.7 MPaG (a gauge pressure) was introduced into a cylindrical part (jacket) of the raw material collection device, and heated so that a vaporized raw material did not condense.

As a superheater, a shell and tube superheater was used in which a large number of tubes were installed in an interior of a shell in the same manner as in the evaporator (a tube diameter: 25.4 mm, a tube length: 390 mm, and a number of tubes: 22). In the superheater on a shell side, saturated vapor at 1.85 MPaG (a gauge pressure) (a temperature of 211° C.) was introduced, and superheating was performed by giving an amount of heat of 5.65 kJ/moL to a process gas (vaporized raw material) generated in the above evaporator. A gas temperature in an outlet of the superheater was 185° C. (160° C.+25° C.).

A tube of a thermal decomposition reactor was heated at 440° C. by electromagnetic induction heating, and the vaporized raw material introduced into the tube was thermally decomposed under the decompression conditions, to obtain N-vinylacetamide.

On the above conditions, a continuous operation was performed for 90 days, but no particular problem occurred.

Example 2

A continuous operation was performed continuously for 90 days by use of the same production apparatus shown in FIG. 2 as in Example 1 and on the same operation conditions as in Example 1, except that superheating was performed by giving an amount of heat of 3.39 kJ/moL to a process gas (vaporized raw material) generated in an evaporator so that a temperature of the process gas in an outlet of a superheater was 175° C. (160° C.+15° C.), but no particular problem occurred.

Example 3

A continuous operation was performed continuously for 90 days by use of the same production apparatus shown in FIG. 2 as in Example 1 and on the same operation conditions as in Example 1, except that superheating was performed by giving an amount of heat of 7.91 kJ/moL to a process gas (vaporized raw material) generated in an evaporator so that a temperature of the process gas in an outlet of a superheater was 195° C. (160° C.+35° C.), but no particular problem occurred.

Comparative Example 1

When a continuous operation was performed with the same production apparatus and on the same operation conditions as in Example 1 except that the production apparatus shown in FIG. 2 of Example 1 did not comprise a superheater, turbulence in temperature of a thermal decomposition reactor was confirmed on a forty-fifth day from start of the operation, and the apparatus was out of control and stopped. As a result of opening and inspection of the production apparatus, it was found that tar and solid coagulum were generated to block an inlet portion of the thermal decomposition reactor.

Comparative Example 2

When a continuous operation was performed using the same production apparatus shown in FIG. 2 as in Example 1 and on the same operation conditions as in Example 1 except that superheating was performed by giving an amount of heat of 0.45 kJ/moL to a process gas (vaporized raw material) generated in an evaporator so that a temperature of the process gas in an outlet of a superheater was 162° C. (160° C.+2° C.), turbulence in temperature of a thermal decomposition reactor was confirmed on a fifty-fourth day from start of the operation, and the apparatus was out of control and stopped. As a result of opening and inspection of the production apparatus, it was found that tar and solid coagulum were generated to block an inlet portion of the thermal decomposition reactor.

INDUSTRIAL APPLICABILITY

According to the present invention, N-vinylacetamide obtained in a production method is a useful monomer in production of N-vinylacetamide polymer for use in a coagulant, a liquid absorbent, a thickener, or the like, and additionally in various industrial applications.

REFERENCE SIGNS LIST 10 raw material feeding device
11 gate valve
12 to 14 piping
20A, 20B evaporator
21 collection pot
22a, 22b extraction valve
30A, 30B raw material collection device
31 distribution inhibiting section
32 cylindrical part
33 collecting section
34 discharge piping
35a to 35e gate valve
36, 71 pressure pump
36a gate valve
37 nitrogen supply device
37a nitrogen valve
40A, 40B superheater
41 extraction valve
42 collection pot
50 thermal decomposition reactor
60 cooler
70 reaction solution receiver
90 first piping
95 piping
100 second piping
100a front stage
100b rear stage
LI liquid level indicator
M motor
PI pressure indicator
S1 feeding step
S2 evaporation step
S3 collection step
S4 superheating step
S5 thermal decomposition step

The invention claimed is:

1. A method for producing N-vinylacetamide, comprising:
a feeding step of feeding a raw material containing N-(1-methoxyethyl)acetamide (MEA) to an evaporator,
an evaporation step of evaporating, by the evaporator, the raw material, to form a vaporized raw material,
a superheating step of feeding the vaporized raw material to a superheater, and superheating the vaporized raw material such that a superheating temperature of the vaporized raw material is equal to or more than a temperature higher by 5° C. than a boiling point of the N-(1-methoxyethyl)acetamide under an inner pressure of the superheater and equal to or less than 200° C., and
a thermal decomposition step of feeding the superheated vaporized raw material to a thermal decomposition reactor, to thermally decompose the superheated vaporized raw material, wherein a content of the N-(1-methoxyethyl)acetamide in the raw material is from 80 to 100 mass %.

2. A method for producing N-vinylacetamide, comprising:
a feeding step of feeding a raw material containing N-(1-methoxyethyl)acetamide (MEA) to an evaporator,
an evaporation step of evaporating, by the evaporator, the raw material, to form a vaporized raw material,
a superheating step of feeding the vaporized raw material to a superheater, and giving an amount of heat of 1.0 KJ/mol or more to the vaporized raw material to superheat the vaporized raw material, and
a thermal decomposition step of feeding the superheated vaporized raw material to a thermal decomposition reactor, to thermally decompose the superheated vaporized raw material, wherein a content of the N-(1-methoxyethyl)acetamide in the raw material is from 80 to 100 mass %.

3. The method for producing N-vinylacetamide according to claim 1, wherein the evaporation step is performed under reduced pressure.

4. The method for producing N-vinylacetamide according to claim 1, wherein the thermal decomposition step is performed under reduced pressure.

5. The method for producing N-vinylacetamide according to claim 1, wherein the evaporator is a falling film evaporator.

6. The method for producing N-vinylacetamide according to claim 1, wherein the evaporator is a forced film evaporator.

7. The method for producing N-vinylacetamide according to claim 1, wherein a downstream end of the evaporator is connected to an upstream end of the superheater via a first piping, and
a downstream end of the first piping is at the highest position in the first piping.

8. The method for producing N-vinylacetamide according to claim 1, wherein a downstream end of the superheater is connected to an upstream end of the thermal decomposition reactor via a second piping, and
- an upstream end of the second piping is at the highest position in the second piping.

9. The method for producing N-vinylacetamide according to claim 1, further comprising, between the evaporation step and the thermal decomposition step, a collection step of collecting, from the raw material fed to the evaporator, a liquid raw material that is not vaporized and a liquid raw material comprising a part of the vaporized raw material that is liquefied,
- the collection step being a step of collecting the liquid raw material by a raw material collection device provided between the evaporator and the thermal decomposition reactor.

10. The method for producing N-vinylacetamide according to claim 9, wherein a downstream end of the evaporator is joined to an upstream end of the raw material collection device.

11. The method for producing N-vinylacetamide according to claim 9, wherein a downstream end of the raw material collection device is joined to an upstream end of the superheater.

12. The method for producing N-vinylacetamide according to claim 10, wherein the vaporized raw material is fed through the raw material collection device to the thermal decomposition reactor.

13. The method for producing N-vinylacetamide according to claim 9, wherein the raw material collection device comprises:
- a cylindrical part through which the vaporized raw material is distributed,
- a collecting section with which a flow of the vaporized raw material flowing through the cylindrical part partially or entirely collides, and which collects, from the raw material fed to the evaporator, the liquid raw material that is not vaporized and the liquid raw material comprising a part of the vaporized raw material that is liquefied, and
- a discharge piping through which the liquid raw material collected by the collecting section is discharged to outside the cylindrical part.

14. The method for producing N-vinylacetamide according to claim 9, wherein the superheated vaporized raw material is fed through the raw material collection device to the thermal decomposition reactor.

* * * * *